United States Patent
Andreussi

(10) Patent No.: US 6,546,809 B1
(45) Date of Patent: Apr. 15, 2003

(54) METHOD FOR MEASURING THE FLOW RATES OF THE SINGLE PHASES IN A MULTIPHASE FLUID STREAM AND RELEVANT APPARATUS

(76) Inventor: Paolo Andreussi, 19, Piazza Gambacorti, 56100 Pisa (IT)

( * ) Notice: Subject to any disclaimer, the term of this patent is extended or adjusted under 35 U.S.C. 154(b) by 0 days.

(21) Appl. No.: 09/913,526
(22) PCT Filed: Feb. 19, 1999
(86) PCT No.: PCT/IT99/00041
§ 371 (c)(1),
(2), (4) Date: Aug. 20, 2001
(87) PCT Pub. No.: WO00/49370
PCT Pub. Date: Aug. 24, 2000

(51) Int. Cl.[7] .............................................. G01F 1/74
(52) U.S. Cl. .................................................. 73/861.04
(58) Field of Search ........................... 73/861.04, 61.47, 73/64.56, 861.08, 196, 200, 861.52

(56) References Cited

U.S. PATENT DOCUMENTS

| | | | | |
|---|---|---|---|---|
| 4,689,989 A | * | 9/1987 | Aslesen et al. | ............ 73/61.44 |
| 4,776,210 A | * | 10/1988 | Baillie et al. | ............... 73/61.47 |
| 5,591,922 A | * | 1/1997 | Segeral et al. | ............ 73/861.04 |
| 6,128,962 A | * | 10/2000 | Marrelli et al. | ............. 324/635 |

FOREIGN PATENT DOCUMENTS

| | | |
|---|---|---|
| EP | 0 684 458 A2 | 11/1995 |
| GB | 2319620 A | 5/1998 |

* cited by examiner

Primary Examiner—Hezron Williams
Assistant Examiner—Takisha S. Miller
(74) Attorney, Agent, or Firm—Browdy and Neimark, P.L.L.C.

(57) ABSTRACT

A method for measuring the liquid and gas flow rates ($Q_L$ and $Q_G$) of a multiphase fluid stream which comprises: withdrawing a portion of the overall flow rate (Q) under isokinetic conditions, measuring the liquid and gas flow rates ($q_L$, $q_G$) of the withdrawn portion, measuring the pressure drop in correspondence of a t least one of the constricted sections located upstream and downstream of the sampling section and calculating said liquid and gas flow rates ($Q_L$, $Q_G$) from the sampling section and calculating said liquid and gas flow rates ($Q_L$, $Q_G$) from the relation $Q_L=(A_1/A_2) q_G$, where $A_1$ and $A_2$ are the areas of the constricted section and of the sampling section respectively. There is described an apparatus operating according to this method, comprising a measurement unit coaxial to the conduit with at least a constricted section, sampling probes for withdrawing a portion of flow, a separator of the phases connected to the probes, flow meters located downstream of said separator and pressure meters at the constricted sections.

15 Claims, 2 Drawing Sheets

METHOD FOR MEASURING THE FLOW RATES OF THE SINGLE PHASES IN A MULTIPHASE FLUID STREAM AND RELEVANT APPARATUS

REFERENCE TO RELATED APPLICATIONS

The present application is the national stage under 35 U.S.C. §371 of international application PCT/IT99/00041, filed Feb. 19, 1999 which designated the United States, and which application was not published in the English language.

DESCRIPTION

1. Field of the Invention

The present invention relates to a method for measuring the flow rate of each phase in a multiphase stream, for example a gas (or vapor) stream in the presence of a significant volume fraction of liquid. The invention also relates to an apparatus for measuring the flow rate of the phases of a multiphase stream operating according to said method.

2. Description of the Prior Art

The measurement of the flow rate of a gas (or vapor) stream in the presence of a significant volume fraction of liquid, or of a liquid stream in the presence of a gas is a common technical problem in the process industry. The coexistance of two liquid phases is also a typical situation. Examples of multiphase flows are encountered in the extraction of endogenic fluids, such as liquid hydrocarbons and water accompanied by gas; gaseous hydrocarbons flows (natural gas) accompanied by a liquid phase consisting of water, or geothermal fluids formed by a vapor phase consisting of steam, as a major part, and gas such as the $H_2S$ and a liquid phase essentially consisting of water.

The measure of the flow rate of the prevailing phase in a multiphase fluid stream cannot, in general, be carried out directly, as the precision of the measure rapidly decreases as the volume fraction of the supplementary phase increases. For this reason the separation of the single phases is first carried out to give raise to two monophase streams, the flow rate of which can then be measured in a easy and extremely precise way by means of known instruments.

Since the solution involves the handling of the overall flow of fluid, the use of a very large separator is requested and not always this solution is logistically feasible and/or economically convenient, particularly when considerable flow rates are involved.

UK patent application no. 2179156 discloses the solution of diverting a portion of the total flow of a triphase mixture flowing in a conduit and to separate the portion in two phases in order to measure the average density of the liquid phase. Therefore, the withdrawal and separation procedure is not necessary when the liquid density is known. In the above disclosure it is proposed in particular a meter operating on the basis of the detection, besides the liquid density, of the total volume flow rate of the mixture, and of the average density of the mixture in order to calculate the flow rate of each phase. The apparatus according to the UK patent application involves using a volume meter of the total flow velocity, said meter having limits of use due to maintenance problems. For example, in a sub-sea installation of the apparatus, repairing or substitution of it would be considerably expensive.

Moreover, the measurement of the combined density of the mixture usually requires the use of a γ-rays absorption meter, which is highly expensive and difficult to install in a production plant. In addition, if the vapor phase is the prevailing phase, the measure of the combined density of the mixture by means of a γ-ray densitometer is barely precise.

SUMMARY OF THE INVENTION

An object of the invention is to provide a method for carrying out a sufficiently precise measure of the flow rate of each phase in a multiphase fluid stream, without the need of processing the whole stream, what would mean the division of the overall stream into a number of monophase streams, and without the above mentioned inconveniences of the metering devices based on the measure of the combined density of the liquid phase.

Another object of the present invention is to provide an apparatus operating according to the above method.

These objects are accomplished with the method and the relevant apparatus for the measure of the flow rate of each phase in a multiphase fluid stream according to the present invention, the main features of which are defined in the attached claims 1 and 9.

The invention accordingly provides that in a measure section, where a fraction of the total flow is sampled by at least a probe, a condition of uniform phase velocity be established, i.e. that $U_L$ and $U_G$ (local velocities of the liquid phase and of the gas phase) be constant over that section even if, in general, $U_L$ and $U_G$ will have different values. Under such condition, if $A_1$ indicates the area of the flow section and $A_2$ indicates the area of the sampling section, i.e. the effective section of the probe (or probes) through which the sampling is performed, the sampling can be defined isokinetic if the sampling flow rate is really equal to the ratio $A_2/A_1$ of the total flow rate of the fluid stream crossing section $A_1$.

Therefore, in the case of isokinetic sampling of the phases in a section in which uniform flow conditions are established ($U_L$ and $U_G$ constant through the section), if $q_L$ and $q_G$ are the liquid and gas flow rates measured in the sampled fraction and $Q_L$ and $Q_G$ are the overall mass flow rates of the liquid and gas flowing through section $A_1$, the following relations apply:

$$Q_L = \frac{A_1}{A_2} \cdot q_L \tag{1a}$$

$$Q_G = \frac{A_1}{A_2} \cdot q_G \tag{1b}$$

If $q=q_G+q_L$ is the total sampled flow rate and $Q=Q_G+Q_L$ the total flow rate flowing throughthe measure section, summing the respective left-hand sides and right-hand sides of equations 1a and 1b we obtain:

$$\frac{q}{Q} = \frac{A_2}{A_1} \tag{2}$$

Dividing the equation 1a by equation 1b we also obtain:

$$\frac{Q_L}{Q_G} = \frac{q_L}{q_G} \tag{3}$$

Therefore, in the case of isokinetic sampling of the phases in a section in which uniform flow conditions are established, the total mass flow rates of liquid and gas $Q_L$ and $Q_G$ can theoretically be obtained directly from $q_L$ and $q_G$ measured after sampling and separation on the basis of the relations (1a) and (1b).

According to the invention, the overall flow rate Q or one of its fractions $Q_G$ or $Q_L$ is obtained by measuring the pressure drop $\Delta p$ of the flow in a constricted section of area $A_1$, typically defined by a nozzle, near the sampling point on the basis of the relation, generally valid for a multiphase system:

$$\Delta p = \alpha \cdot Q^2 \qquad (4)$$

where $\alpha$ (which has the dimension of a specific volume) is the calibration coefficient of the nozzle, depending on the geometry of the constricted section, the physical properties of the phases and the value of the ratio $Q_L/Q_G$ between the flow rates of the phases. For a given geometry and small variations of physical properties and phase flow rates, $\alpha$ is constant with good approximation.

A suitable use of equation (1a), (1b), (2), (3) and (4) allows the flow rates of the single phases $Q_L$ and $Q_G$ to be determined according to some possible procedures that will be described below. It is worth noting that the results of these procedures are affected by substantially negligible errors even if the condition (2) of isokinetic sampling is only approximately met. As a matter of fact, in a condition in which the gas phase is the prevailing one, even if the sampling is only approximately isokinetic equation (1a), which allows to obtain $Q_L$ from the measure of the flow rate of the sampled liquid $q_L$ and the known value of $A_1/A_2$, is anyway valid. In the cases in which the liquid phase if prevailing, even if the sampling is only approximately isokinetic, equation (3) is anyway valid. In both cases of prevailing gas or of prevailing liquid, the measure of $Q_L$ or of the ratio $Q_L/Q_G$ in combination with equation (4) allow to obtain Q and the phase flow rates, $Q_L$ and $Q_G$.

An important feature of the invention lies in the way by which uniform velocity conditions are established in the sampling section. In the case of prevailing flow of a liquid phase, uniform velocity conditions of the phases can be easily established by carrying out the sampling downstream of a constricted section of the conduit, for example the outlet section of a nozzle, so as to have conditions of high turbolence of the phases. Before the nozzle a mixer or a static mixer can be provided for.

If the prevailing phase is a gas (or a vapor) and dispersed annular flow conditions are established in the conduit, the average velocity of the phases $U_G$ and $U_L$ are such that $U_G$ can be considerably greater than $U_L$ and also the liquid can flow in the conduit as a film at the conduit walls and as dispersed droplets in the gas phase. In this case the liquid velocity in the film, $U_L$ is considerably lower than the velocity of the droplets entrained by the gas and it is difficult to establish conditions of uniform velocity of the liquid in the sampling section. In order to achieve this result, it is not sufficient to carry out the sampling downstream of the constricted section of a nozzle, but it is necessary that the sampling section be preceded by one or more sections of the conduit and the nozzle in which the liquid film is removed from the wall and, as a consequence, atomised and accelerated by the gas phase.

The presence of mixers, nozzles and sections of suitable geometry may be not sufficient to guarantee homogeneous flow conditions at the sampling section, in particular when pressure drops through the sampling system must be kept as low as possible. In order to overcome this possibile drawback and, in general, to reduce the errors to a minimum, it is advisable to carry out the sampling by using more probes symmetrically arranged and in suitable positions.

The sampled flow rates of the liquid and the gas $q_L$ and $q_G$ are determined by using respective meters of the known type for monophase stream, after the phase separation is carried out in a gas-liquid separator of the known type, which has to process a small portion only of the overall flow rate (approximately 5% to 15% of the total flow rate, said figure being equal to $A_2/A_1$) and, therefore, can have a simple structure and a very small volume. After the measure the sampled streams are taken into the main stream again.

BRIEF DESCRIPTION OF THE DRAWINGS

The features and advantages of the method according to the present invention and of the relevant apparatus will be apparent from the following description of possible non-limiting and exemplifying embodiments, with reference to the attached drawings in which.

DESCRIPTION OF THE PREFERRED EMBODIMENT

Figure 1:
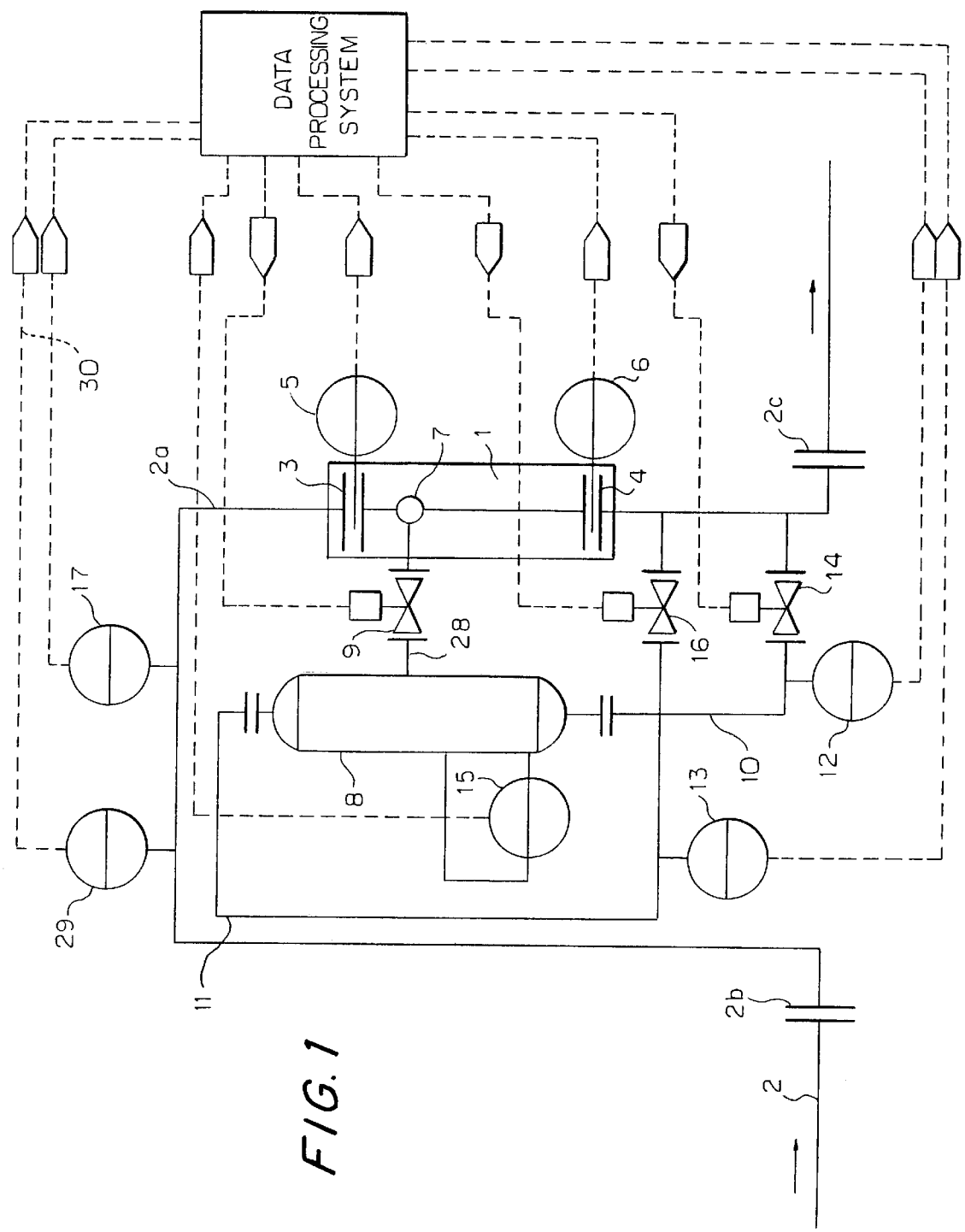
FIG. 1 is a functional diagram of an apparatus for measuring the flow rates of each phase in a multiphase fluid stream operating on the basis of the method of the invention.

With reference to FIG. 1, a measure unit 1 is arranged in a downwardly flowing, vertical portion 2a of a conduit 2 between two flanged sections 2b and 2c.

As detailed below, measure unit 1 comprises two consecutive constricted sections 3 and 4 with respect to conduit 2, in correspondance of which respective differential pressure gauges of the known type are mounted, schematically indicated at 5 and 6, fit for carrying out the measure of the pressure drop $\Delta p$ due to the passage of the flow through constricted sections 3 and 4.

Immediately downstream of first constricted section 3 a sampling unit 7 is mounted in the measure unit 1, which will be described later in more detail. Sampling unit 7 has the function to divert a flow rate q from the overall flow. Sampling unit 7 communicates with a gas-liquid separator 8, of the known type, to which the sampled flow rate q is fed, through line 28 intercepted by a valve 9, and is divided into the liquid and gas components. The liquid phase is discharged from the bottom of separator 8 through conduit 10, while the gas phase comes out from the top through conduit 11.

Conduits 10 and 11, which are provided to feed the liquid and gas sampled flow rate in conduit 2 downstream of unit 1, are intercepted by respective flow meters 12 and 13 of the known type, for providing a continuous flow rate measurement. Downstream of flow meter 12 liquid conduit 10 is also intercepted by a valve 14, which can be closed to carry out a discontinuous measurement of the liquid flow rate $q_L$. The discontinuous measurement is achieved by determining the time necessary to fill a volume comprised between two prefixed heights by means of a level indicator 15 associated to separator 8. Level indicator 15 is equipped with a differential pressure gauge to obtain the average density of the liquid, by means of which, in the case of a two-phase liquid, it is possible to calculate the flow rate of the two liquid phases if the density of each of them is known.

Downstream of flow meter 13 gas line 11 is intercepted by a valve 16 which is operated to control the sampled flow rate q.

Respective absolute pressure indicator 29 and temperature indicator 17 are associated to conduit 2 upstream of the measure unit 1, to monitor temperature T and pressure P of the fluid flowing therein. Discontinuous lines 30 represent the electrical connections of the above cited valves and meters to a data processing system, for example a common personal computer, not shown, equipped with suitable hardware and software means, not shown nor described in detail in so far as they have known features for a person skilled in the art. In particular, the system is fit for receiving and processing the signal transmitted by instruments 5,6,12,13, 15,17 and 29 and, as a function of the received signals, to send operating signal to valves 9, 14 and 16, possibly according to programmable sequences.

Figure 2:
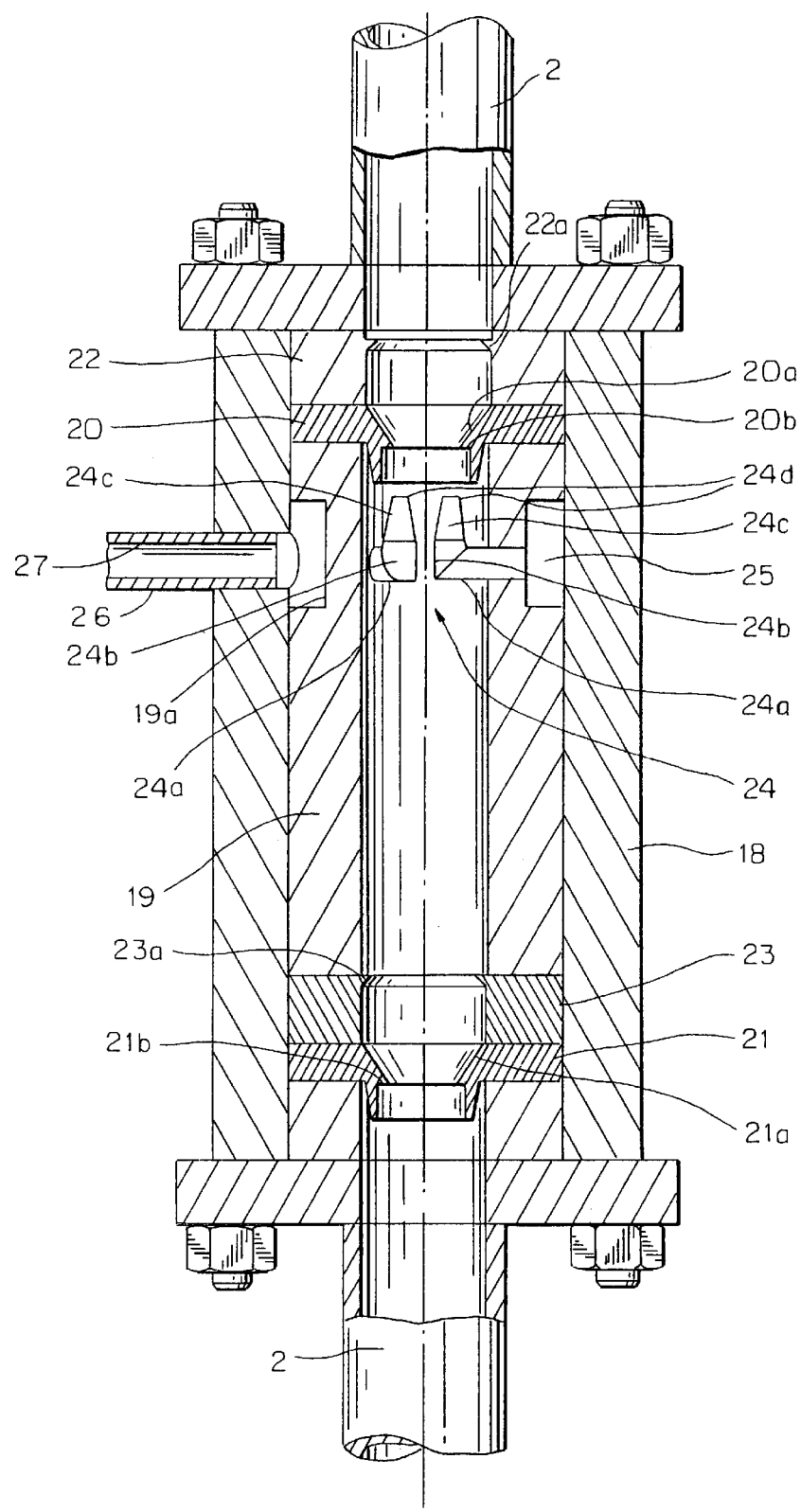
FIG. 2 is an axial sectional view of the measure unit of the apparatus of FIG. 1.

With reference also to FIG. 2, the measure unit 1 comprises an external containment jacket 18, in which a tubular ember 19 with inner section equal to the conduit section is axially engaged. Nozzles 20 and 21 are axially engaged in jacket 18 immediately upstream and downstream of tubular member 19. They define constricted sections 3 and 4 by means of frustoconical surfaces 20*a*, 21*a* converging in the flow direction from an inlet section equal to the flow section of tubular member 19, are axially engaged in jacket 18. Pressure indicators 5 and 6 are installed in correspondence to nozzles 20 and 21. The area of the constricted section of each nozzle is equal to $A_1$. First nozzle 20 partially extends in tubular member 19 and has a ring 22 at the outer end in jacket 18. The end of conduit 2 has a diameter equal to the inlet diameter of nozzle 20 and abuts against ring 22, a seal being interposed therebetween. A lip or annular projection 22*a* is formed on the inner surface of ring 22 to break any possible liquid film flowing along the conduit wall.

Arranged within tubular member 19 are sampling probes 24 (three in the shown example), which are angularly, equally spaced, each of them being formed by a substantially L-shaped conduit, comprising a radial portion 24*a* extending from the inner surface of tubular member 19 near first nozzle 20 and an axial portion 24*b* oriented towards first nozzle 20. Free end of axial portion 24*b* has a frustoconical profile 24*c* and defines a respective sampling port for intercepting the flow at the outlet from first nozzle 20. The sampling ports define as a whole the sampling section of area $A_2$, preferably comprised between 5 and 15% of $A_1$.

In correspondence of sampling probes 24 a circumferential groove 19*a* is formed on the outer surface of tubular member 19 close to jacket 18 to define an annular chamber 25 in cooperation with jacket 18. Axial portions 24*a* of sampling probes 24 communicate with annular chamber 25 which, in turn, communicates with an outlet conduit 26 radially and outwardly extending from tubular member 19 through an opening 27 formed on jacket 18. Therefore, the overall sampled flow rate q can flow to the inlet of separator 8 from probes 24 through chamber 25, conduit 26 and conduit 28.

Upstream of second nozzle 21 a respective ring 23 is similarly provided, said ring being installed between nozzle 21 and tubular member 19 and having a lip or annular projection 23*a* with the same function as that of ring 22. Similarly nozzles 20 and 21 are so designed as to allow for the liquid film to be removed from the walls and to cause a mixing thereof. In particular, they are provided with lips or annular projections 20*b* and 21*b* at the ends of they respective converging portions.

The procedure for carrying out the measure according to the invention is different according on whether a continuous or a discontinuous measure and, consequently, a continuous or discontinuous sampling is carried out.

In a first embodiment of the invention a discontinuous measure is assumed to be carried out. The sampling is performed by opening valve 9 and the amount of sampled flow is controlled by means of valve 16. This control is carried out at the beginning of the operation and has to be repeated only when substantial changes in the operating conditions occur. As a preliminary step, i.e. when sampling is inoperative (valve 9 closed), the pressure drop $\Delta P_1$ occurring in total flow $Q_1$ (unknown) is measured by gauge 6, in correspondence to second nozzle 21.

Then pressure drop $\Delta P_2$ occurring in the flow $Q_2 = Q_1 - q$ i.e. when sampling is operative (valve 9 open), is measured by gauge 6 in correspondence to second nozzle 21. In the meantime separator 8 separates out sampled flow rate 9 into its liquid $q_L$ and gaseous $q_G$ components which are fed to conduits 10 and 11 and measured. While liquid flow rate $q_L$ can be measured both discontinuously, through valve 14 and level indicator 15, and continuously, at least with reference to the time interval during which the sampling is carried out, by meter 12 (only one of such measuring system can be provided for indifferently), the gas flow rate $q_G$ can be measured in a continuous way only by meter 13, over the same sampling time interval.

The data processing system operates on the basis of an algorythm which calculates $Q_1$ as the sole unknown term from the following relation:

$$\frac{\Delta p_1}{\Delta p_2} = \left(\frac{Q_1}{Q_1 - q}\right)^2 \qquad (5)$$

obtained from (4) by assuming that the nozzle coefficient α be constant under small variations of the operating conditions.

In order to verify that the sampling has been carried out in a isokinetic way, it must be controlled that equation (2) be at least approximately satisfied. The value of the left-hand side of equation (2) must be comprised between ± 20% of the value of the right-hand side, which is defined by geometrical parameters of the meter (constricted flow section of area $A_1$ and sampling section of area $A_2$). If it is not the case, the sampling has to be repeated with a different regulation of valve 16, until the above mentioned condition is met.

From equation (3), which is valid even if the sampling is only approximately isokinetic, $Q_G$ and $Q_L$ can be obtained taking into account that their sum is equal to $Q_1$.

If the prevailing phase (as a volume) is the gas phase, experimental tests have shown that it is convenient to obtain the gas flow rate from equation (5) directly as follows:

$$\frac{Q_G}{Q_G - q_G} = \sqrt{\frac{\Delta p_1}{\Delta p_2}} \qquad (6)$$

and the liquid flow rate from (1a). This can be justified by the fact that, due to the greater inertia of the liquid with respect to the gas, the sampled liquid fraction is equal to the ratio $A_2/A_1$, even if the gas sampling is not exactly isokinetic.

It is worth noting that the above described procedure allows the system calibration, i.e. the experimental reckoning of the nozzle coefficient present in equation (4) to be avoided. Furthermore, if the system has to be operated in a continuous way, as described hereinafter, it is possible to carry out the system autocalibration with the discontinuous procedure.

According to another embodiment of the invention it is possible to carry out continuous sampling and measurement by using the pressure value detected either at both nozzles 20 and 21 or at second nozzle 21 only. In the first case, the following relations apply:

$$\Delta p_{20} = \alpha_{20} \cdot Q_1^2 \quad (7)$$

$$\Delta p_{21} = \alpha_{21} \cdot (Q_1 - q)^2 \quad (8)$$

by which the flow rates crossing nozzles 20 and 21 ($Q_1$ and $Q_1-q$ respectively) are related to the respective pressure drops.

By operating in a similar way as for the discontinuous sampling, $Q_1$ can be obtained from the following relation:

$$\frac{\Delta p_{20}}{\Delta p_{21}} = \frac{\alpha_{20}}{\alpha_{21}} \left( \frac{Q_1}{Q_1 - q} \right)^2 \quad (9)$$

which replaces equation (5). In general $\alpha_{20}$ is different from $\alpha_{21}$ and both coefficients must be known as a function of the operating conditions, physical properties of the fluid and geometry relevant to each specific application. This operating way assumes that the coefficients $\alpha_{20}$, $\alpha_{21}$ be known with sufficient precision by way of nozzle calibration or system autocalibration using the discontinuous procedure and, in particular, it is assumed that their ratio can be considered as a constant with the variation of the operating conditions.

The verification that the sampling is isokinetic and the calculation of $Q_G$ and $Q_L$ are again performed with equations (2) and (3) respectively. As in the case of the discontinuous measurement, if the prevailing phase is the gas phase, the direct gas flow rate calculation is more precise from the relation:

$$\frac{Q_G}{Q_G - q_G} = \sqrt{\frac{\Delta p_{20} \cdot \alpha_{21}}{\Delta p_{21} \cdot \alpha_{20}}} \quad (10)$$

analogous to equation (6), and the liquid flow rate from equation (1a).

As previously mentioned it is also possible a continuous measurement which makes use, as in the discontinuous case, of the pressure drop measure obtained from gauge 6 of second nozzle 21 only, or from gauge 5 of first nozzle 20 only. In this case, the total flow rate must be calculated through equation (4) applied to the nozzle used for the measurement. The value of the coefficient $\alpha$ is, inter alia, a function of the ratio $X_L$ between $Q_L$ and $Q_G$ and the dependancy must be obtained by calibration. The equation (4) can be rewritten as:

$$\Delta p = \alpha(X_L) \cdot (1+X_L)^2 \cdot Q_G^2 \quad (11)$$

where $Q^2$ equal to $(1+X_L)^2 \cdot Q_G^2$ and $\alpha(X_L)$ is the dependancy, known by calibration, of the coefficient $\alpha$ from $X_L$ ratio. Equation (11), which can be referred to nozzle 20 or nozzle 21 without distinctions, can be solved with respect to $Q_G$, when $\Delta p$ is known, with an iterative procedure, by which a $X_L$-value is assumed as a first attempt on the basis of a value of $Q_L$ equal to that calculated from (1a). This value of $Q_L$ is not changed in the course of the iterative calculation. The value of $Q_G$ is obtained from (11) and is used to obtain a second value of $X_L$. The procedure is carried on up to convergency.

The continuous measurement requires calibration operations that can be even difficult, but does not requires sampling interruptions and for this reason it can be preferred in some applications. As a matter of fact continuous sampling, though potentially less precise, can be easier to practice, as it is not necessary a periodic valve operation. Also it has to be remarked that the discontinuous measurement of the liquid flow rate is especially advantageous, or even necessary, to measure very low liquid flow rates, which cannot be measured by means of other methods or instruments. Finally it is worth noting that, though with increase of costs, the apparatus can be made in such a way as to be able to operate both in the discontinuous and the continuous mode and the discontinuous mode can be used as a periodical autocalibration of the continuous mode.

The section constrictions 3 and 4, defined by nozzles 20 and 21, must be spaced by a lenght of duct at least equal to five times the mean diameter of the conduit in which the measurement unit 1 is mounted, to avoid any interference between the respective turbolencies induced in the fluid.

It will be appreciated how the method and the apparatus according to the invention make it possible to obtain the flow rates of each phase in a multiphase fluid stream, by withdrawing a proportion of the overall fluid flow with all the advantages that this way of operating involves. Furthermore, it has to be noted that the maximum occurring error in any case is fully compatible with the majority of the industrial uses of the method.

Variations and/or modifications can be brought to the method for measuring the flow rate of each phase in a multiphase fluid stream and the relevant apparatus according to the present invention without departing from the scope of the invention itself, as defined in the appended claims.

What is claimed is:

1. Method for the measurement of the liquid and gas flow rates $Q_L$ and $Q_G$ in a multiphase fluid stream flowing in a conduit (2) and having an overall flow rate Q, comprising:

withdrawing a portion of the overall flow rate Q of said stream from a section of area A1 in which substantially isokinetic conditions are established, at a sampling section of area $A_2$, $A_2$ being a fraction of $A_1$;

separating out said withdrawn portion of fluid stream into single liquid and gas components;

measuring the liquid and gas flow rates $q_L$ and $q_G$ forming said withdrawn portion of fluid stream and calculating their sum q;

obtaining pressure signals to measure the pressure drop $\Delta p$ occurring in said fluid stream in at least one of a first constricted section (3) and a second constricted section (4) located upstream and, respectively, downstream of said sampling section;

from said pressure drop $\Delta p$ calculating the overall flow rate Q, or at least the flow rate $Q_G$ of the gas fraction thereof, flowing in the corresponding constricted section, on the basis of the relation $\Delta p = \alpha Q^2$, $\alpha$ being the calibration coefficient of the constricted sections;

calculating the ratio between the flow rate value obtained from said relation and the flow rate q of said withdrawn portion, to verify that it is at least approximately equal to ratio $A_1/A_2$;

varying the sampled portion flowrate if the ratio between the overall flowrate to the withdrawn portion flowrate is not approximately equal to $A_1/A_2$ and repeating the measure; and, calculating the overall liquid and gas flow rates $Q_L$ and $Q_G$ from the liquid gas phase flow rates $q_L$ and $q_G$ in said withdrawn portion from the relations $Q_L=(A_1/A_2) \cdot q_L$ and $Q_G=(A_1/A_2) \cdot q_G$.

2. Method according to claim 1, comprising the steps of:

obtaining said pressure signals in correspondence to said second constricted section (21) downstream of said sampling section in the absence and in the presence of said sampling, to measure the pressure drops $\Delta p_1$ and $\Delta p_2$ correspondingly occurring in said fluid stream;

obtaining the overall flow rate $Q_1$ from the relation $$\frac{\Delta p_1}{\Delta p_2} = \left(\frac{Q_1}{Q_1-q}\right)^2 \quad (5)$$

when using the relation $\Delta p = \alpha Q^2$ as applied to said pressure signals obtained with and without said sampling, the value of the coefficient $\alpha$ being assumed as a constant.

3. Method according to claim 1, comprising the steps of:

obtaining said pressure signals in constricted sections (20, 21) located upstream and downstream of said sampling section respectively in the presence of said sampling, to measure the pressure drops $\Delta p_{20}$ and $\Delta p_{21}$ correspondingly occurring in said fluid stream;

obtaining the overall flow rate $Q_1$ from the relation $$\frac{\Delta p_{20}}{\Delta p_{21}} = \frac{\alpha_{20}}{\alpha_{21}}\left(\frac{Q_1}{Q_1-q}\right)^2 \quad (9)$$

when using the relation $\Delta p = \alpha Q^2$ as applied to said pressure signals from said contricted sections the values of the coefficients $\alpha_{20}$ and $\alpha_{21}$ being obtained by calibration.

4. Method according to claim 1, comprising the steps of:

obtaining said pressure signals from either the constricted section located upstream of or downstream of said sampling section (20, 21) in the presence of said sampling to measure the pressure drop $\Delta p$ correspondingly occurring in said fluid stream;

obtaining the overall flow rate of the gas phase $Q_G$ through an iterative process from the relation;

$$\Delta p = \alpha(X_L) \cdot (1 + X_L)^2 \cdot Q_G^2 \quad (11)$$

when using the relation $\Delta p = \alpha Q^2$ the dependancy $\alpha(X_L)$ of the coefficient $\alpha$ from the ratio $X_L$ between the overall liquid and gas flow rates $Q_L$ and $Q_G$ being obtained by calibration.

5. Method according to claim 1, wherein said portion of fluid stream is withdrawn through a plurality of sampling ports (24d) located near the longitudinal axis of said conduit (2).

6. Method according to claim 1, wherein the ratio between the measured overall flow rate Q and the withdrawn overall flow rate q is ±20% of the ratio $A_1/A_2$.

7. Method according to claim 1, wherein the area $A_2$ of said sampling section is comprised between 5 and 15% of the area A of said flow section.

8. Apparatus for measuring the flow rates of each phase of a multiphase fluid stream comprising a measurement unit (1) coaxially intercepting a conduit (2), including at least one constricted section (3,4) having a smaller cross section than the conduit, means (24) located upstream of said at least one constricted section for sampling a portion of said fluid stream defining a sampling section in which uniform flow conditions are established, the area of said sampling section being $A_2$ that is a fraction of the area $A_1$ of the conduit where the sample is taken, separator means (8) for separating out the phases of said portion associated to said sampling means (24), metering means (12,13,15) for producing flow rate measure signals representing the values of the flow rates of each phase of said sampled portion associated to said separator means (8), means for controlling the flow rates of at least one of said sampled portion and the separated phases, means for providing pressure signals (5,6) associated to said at least one of said sampled portion and the separated phases, means for providing pressure signals (5,6) associated to said at least one constricted section (3,4), and computer means for processing the pressure signals and the flow rate measure signals and controlling the flow through said sampling means, in such a way that the ratio between the sampled flow rate and the total flow rate is approximately equal to $A_2/A_1$.

9. Apparatus according to claim 8 wherein said measurement unit (1) comprises mixing means of said fluid stream at least upstream of said sampling section.

10. Apparatus according to claim 8 wherein said measurement unit (1) comprises a first and a second constricted section (3, 4) located upstream of and downstream of said sampling section respectively.

11. Apparatus according to claim 8, wherein said sampling means comprises a plurality of substantially L-shaped sampling probes (24), communicating with said separator means (8) and angularly equispaced, having sampling ports (24d) defining said sampling section perpendicular to the flow direction and located near the longitudinal axis of the conduit (2).

12. Apparatus according to claim 11, wherein each sampling probe is formed by a radial portion and an axial portion with a free end in correspondence of which a sampling port is formed.

13. Apparatus according to claim 11, wherein said measurement unit comprises a jacket (18) with which a tubular member (19) is coaxially engaged, said first and second constricted sections (3, 4) being defined by a first and a second nozzle (20, 21/) coaxially mounted within said jacket (18), upstream of and downstream of said tubular member (19) respectively, said sampling probes extending within said jacket (18) in correspondence to said tubular member (19).

14. Apparatus according to claim 13, wherein respective lips (20b, 21b) extend radially within said nozzles (20, 21) to detach any liquid wall film.

15. Apparatus according to claim 13, wherein respective rings (22, 23) each having an annular projection radially extending inwardly are arranged within said jacket (18) upstream of a respective of said nozzles (20, 21).

* * * * *

UNITED STATES PATENT AND TRADEMARK OFFICE
CERTIFICATE OF CORRECTION

PATENT NO. : 6,546,809 B1  Page 1 of 1
APPLICATION NO. : 09/913526
DATED : April 15, 2003
INVENTOR(S) : Andreussi et al.

It is certified that error appears in the above-identified patent and that said Letters Patent is hereby corrected as shown below:

In Claim 8, at column 10, lines 13-15, cancel the text reading, "of said sampled portion and the separated phases, means for providing pressure signals (5,6) associated to said at least one".

Signed and Sealed this

Ninth Day of June, 2009

JOHN DOLL
*Acting Director of the United States Patent and Trademark Office*